(12) United States Patent  
Rapp

(10) Patent No.: US 6,502,395 B1  
(45) Date of Patent: Jan. 7, 2003

(54) SEAL FOR HYDROPNEUMATIC PRESSURE INTENSIFIER

(75) Inventor: Eugen Rapp, Berg (DE)

(73) Assignee: TOX Pressotechnik GmbH & Co., KG, Weingarten (DE)

( * ) Notice: Subject to any disclaimer, the term of this patent is extended or adjusted under 35 U.S.C. 154(b) by 0 days.

(21) Appl. No.: 09/700,411

(22) PCT Filed: Dec. 17, 1999

(86) PCT No.: PCT/DE99/04027

§ 371 (c)(1),  
(2), (4) Date: Nov. 15, 2000

(87) PCT Pub. No.: WO00/39466

PCT Pub. Date: Jul. 6, 2000

(30) Foreign Application Priority Data

Dec. 23, 1998 (DE) .......................... 198 59 891

(51) Int. Cl.$^7$ .................................. F15B 7/00
(52) U.S. Cl. ........................... 60/563; 60/560
(58) Field of Search ................ 60/547.1, 560, 60/563

(56) References Cited

U.S. PATENT DOCUMENTS

| 4,449,718 A | * | 5/1984 | Muller | 277/165 |
| 5,377,488 A | * | 1/1995 | Malina | 60/560 |
| 5,433,452 A | * | 7/1995 | Edlund et al. | 277/165 |

FOREIGN PATENT DOCUMENTS

| DE | 28 34 895 | 3/1980 |
| DE | 32 25 906 | 1/1984 |
| DE | 38 28 699 | 3/1990 |
| DE | 42 23 411 | 1/1994 |
| EP | 0 579 037 | 1/1994 |
| EP | 0 582 593 | 2/1994 |
| EP | 0 670 444 | 9/1995 |

* cited by examiner

Primary Examiner—F. Daniel Lopez  
(74) Attorney, Agent, or Firm—Paul Vincent

(57) ABSTRACT

The invention relates to a hydropneumatic pressure intensifier comprising a radial seal (24, 27). Said seal is arranged between working pistons (2) and the cylinder bore which accommodates said pressure intensifier or in a bore hole (15) between the working chamber (3) and a storage area (14), whereby the radial seals consist of viscoplastic and flexible synthetic material.

10 Claims, 1 Drawing Sheet

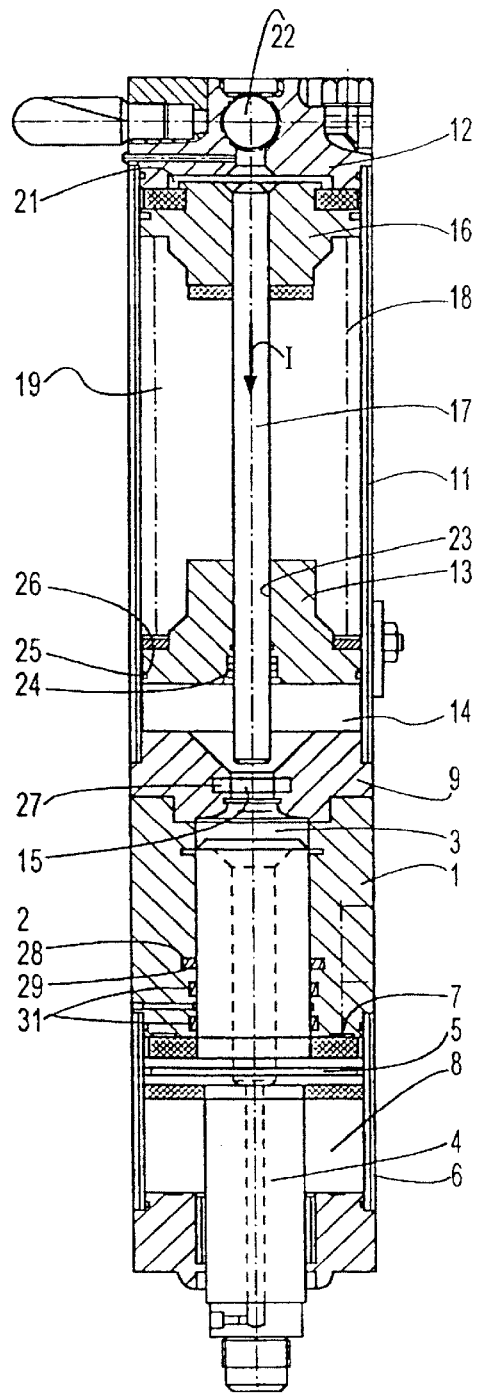
FIG.1
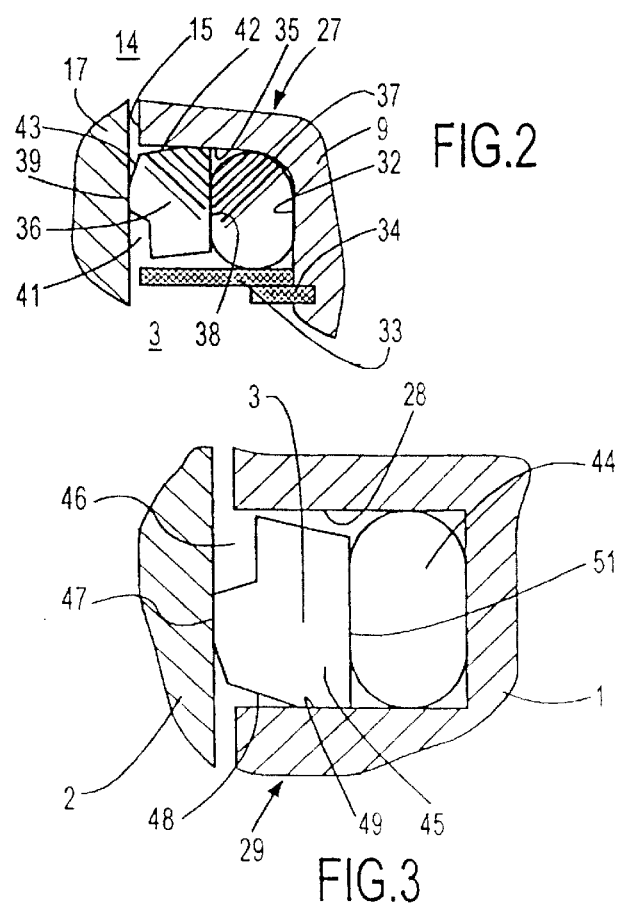

SEAL FOR HYDROPNEUMATIC PRESSURE INTENSIFIER

BACKGROUND OF THE INVENTION

The invention concerns a hydropneumatic pressure intensifier of the type categorizing the main claim. Hydropneumatic pressure intensifiers of this type are used mainly for machine tools and function with alternating pressures, i.e. high pressure and low pressure in the working chamber, and having pneumatic and hydraulic working means exhibiting alternating rapid pressure increases and changes between overpressure and underpressure. This affects in particular the sealing rings of the seals between the working piston and the cylindrical wall of the working chamber and/or the sealing ring in the connecting bore between the working chamber and the storage chamber, wherein, at low pressure, the plunger piston is repeatedly introduced into and removed out of the sealing ring. This plunging process requires appropriate design of the sealing ring to ensure that when the plunger piston is immersed, the end face of the plunger piston does not clamp on the sealing ring side facing same, wherein the radial forces produced by the rubber-elastic tensioning ring, which have a corresponding effect on the clearance of the sealing ring, have to be taken into consideration. The sealing ring must have an appropriately large radial stiffness and guarantee static and dynamic sealing. The sealing ring must, of course, have high wear resistance and extrusion resistance with long service life and should facilitate assembly without deformation of the sealing edges. The sealing ring must, in particular, resist extremely high loads, i.e. high pressures and pressure shocks.

A known hydropneumatic pressure intensifier of the type categorizing the invention (EP 0 579 073 B1 and DE-PS 32 25 906 C2) provides the optimum preconditions for the expert, in particular for the producer of the patented sealing ring. It is thereby assumed that the high pressure can directly act on the sealing ring from one side. Due to the step provided in the direction of the working chamber on the circumferential surface of the sealing ring facing the piston, this sealing ring is axially loaded and pressed against the end wall, facing away from the working chamber, of the annular groove receiving the sealing ring without producing actual deformation of the sealing ring to thereby provide the intended sealing support of the sealing surface on the piston surface. Other sealing rings produced by this sealing ring manufacturer which are made from softer distortable material would not be used by one of average skill in the art, since their radial stiffness is either too low for immersion or they cannot withstand the high pressures and dynamic wear.

Practice has moreover shown that the above-mentioned sealing ring used for hydropneumatic pressure intensifiers consists of a material which is distributed under the trademark Turcon T46 which has metallic inclusions producing increased friction between the sealing ring and piston which act like sanding dust at this location. These metallic inclusions may also be caused by friction on the piston due to the hardness of the sealing material. This has, in end effect, the same result as sanding dust and guarantees good sealing and durability or service life due to the structure of the sealing ring while reducing wear on the piston in the sealing area.

SUMMARY OF THE INVENTION

In contrast thereto, the inventive hydropneumatic pressure intensifier having the characterizing features of the main claim (in contrast to the expectations of one of average skill in the art and despite the expected relatively easy incorporation of the sealing ring due to the associated pressure and friction acting on the piston) not only advantageously provides good sealing and durability, i.e. service life, but also prevents wear in the frictional area between the sealing ring and piston surface. Moreover, in contrast to the expectations of one of average skill in the art, immersion of the plunger piston into the sealing ring is very easy although, due to the increased softness, the sealing ring can be deformed by the tensioning ring in the direction of the sealing surface. Such a relatively soft sealing ring with corresponding cross-sectional design is known per se (EP 0 670 444) as is the typical deformation of this sealing ring (EP 0 582 593). The material used is distributed by the producer under the trademark Zurcon: the sealing ring itself under the trademark Rimseal. The producer recommends use of this seal only as a secondary seal especially for relatively high pressures. It was developed explicitly as such and only in this way can safe sealing of thin oil films be guaranteed, in particular, with low secondary pressures. The material is polyurethane with Shore D 58. One of average skill in the art uses such a sealing ring in particular if the piston exhibits a slight tilting movement with respect to its cylinder. Immersion of a plunger piston into such a soft material is not considered to be acceptable by one of average skill in the art. The above-mentioned relatively hard sealing ring is recommended for the primary seal and is used in conventional hydropneumatic intensifiers. Due to the relatively soft material, which is also absolutely free from metallic inclusions, the piston surface is not subjected to frictional wear which could lead to the above-mentioned sanding dust effect.

In accordance with an advantageous embodiment of the invention, the opposite walls of the annular groove or the like extend essentially parallel to one another. As a result thereof, the sealing ring is loaded with unilateral forces produced by the conical travel of the end wall and acting in the direction of the piston.

In accordance with a further advantageous embodiment of the invention, the plastic material of the sealing ring does not have any metallic inclusions. This has the principal advantage of preventing mechanical wear of the piston surface.

In accordance with another advantageous embodiment of the invention, the sealing ring consists of a plastic material produced by the company Busak and Shamban under the name Zurcon with the trademark Rimseal and made from a special polyurethane 58 Shore B.

In accordance with another advantageous embodiment of the invention, the working piston comprises a pneumatically loaded collar for its fast stroke drive, wherein the rear side of the seal is alternately loaded with pneumatic working pressure and with the lowermost pressure.

In accordance with another advantageous embodiment of the invention, the sealing ring is directly loaded at the working chamber side with the pressure of the working chamber, without any other intermediate sealing elements.

BRIEF DESCRIPTION OF THE DRAWING

Further advantages and advantageous embodiments of the invention can be extracted from the following description, the drawing and the claims.

One embodiment of the subject matter of the invention is shown in the drawing and explained in more detail in the following:

FIG. 1 shows a longitudinal section through a hydropneumatic pressure intensifier;

FIG. 2 shows each a section in the area of a radial seal of FIG. 1, in an enlarged scale FIG. 3 shows a section in the area of a radial seal of FIG. 1, in an enlarged scale.

DESCRIPTION OF THE PREFERRED EMBODIMENT

In the hydropneumatic pressure intensifier shown in FIG. 1, a working piston 2 is disposed in a casing 1 in an axially displaceable and radially sealed manner and delimits therewith a working chamber 3 filled with hydraulic oil. A piston rod 4 is disposed on the working piston 2 and projects beyond the casing 1. The working piston 2 further comprises an auxiliary piston 5 shaped as a collar which is radially sealed towards the tubular shell 6 and thereby separates two pneumatic chambers 7 and 8 which are supplied alternately with air pressure for the fast stroke of the working piston 2. As soon as the air pressure in the pneumatic chamber 7 is sufficiently high and the pressure in the pneumatic chamber 8 is sufficiently low, the working piston 2 is pushed downward. Conversely, with corresponding high pressure in the pneumatic chamber 8 and reduced pressure in the pneumatic chamber 7, the piston 2 is displaced again in the initial position shown.

The working chamber 3 is closed on the side facing away from the piston 2 by a casing part 9 to which a tubular shell 11 is attached which, in turn, is closed by a casing lid 12. A storage piston 13 is disposed in the tubular shell in an axially movable fashion and delimits a storage chamber 14 along with the tubular shell 11 and casing part 9. This storage chamber 14 is hydraulically connected to the working chamber 3 via a plunger bore 15 disposed in the casing part 9. A drive piston 16 is also disposed in the tubular shell 11 in a radially sealed fashion for actuating a plunger piston 17 and is loaded by a storage spring 18 which is supported on the storage piston 13 on the side facing away from the drive piston 16 and thus determines the storage pressure present in the storage chamber 14 and serves as a restoring force for the drive piston 16. The spring chamber 19 accommodating the spring 18 is pressure-relieved. A driving chamber 21 is disposed on the side of the drive piston 16 facing away from the spring chamber 19 and can be supplied, via a connection 22, with pressurized air to drive the drive piston 16.

The plunger piston 17 is axially displaceably guided in a central bore 23 of the storage piston 13, wherein a radial seal 24 prevents hydraulic oil from passing from the storage chamber 14 into the spring chamber 19. A radial seal 25 is disposed in an annular groove 26 in the surface region of the plunger piston 13 and seals towards the tubular shell 11 to also prevent hydraulic oil from reaching the spring chamber 19.

During its driving motion in the direction of the arrow I, effected by the pressurized air in the driving chamber 21, the plunger piston 17 penetrates the plunger bore 15 thereby separating the storage chamber 14 from the working chamber 3. To achieve absolute separation, a radial seal 27 is disposed in the wall of the plunger bore 15. (Shown in FIG. 2 in an enlarged scale). As soon as the plunger piston 17 is immersed in the working chamber 3, the hydraulic fluid therein is displaced, thereby producing corresponding pressure intensification of the air pressure prevailing in the driving chamber 21 relative to the hydraulic pressure prevailing in the working chamber 3 in accordance with the cross-sectional ratio between the drive piston 16 and plunger piston 17. Due to the relatively large cross-sectional surface of the working piston 2, a correspondingly large actuating force for the piston rod 4 is produced in accordance with the hydraulic pressure in the working chamber 3. To be able to maintain the pressure in the working chamber 3, and to prevent hydraulic fluid from passing from the working chamber 3 into the pneumatic chamber 7, a radial seal 29 is disposed in an annular groove 28 in the casing 1. (Shown in FIG. 3 in an enlarged scale). The casing 1 further comprises two annular toroidal sealing rings 31 which seal towards the working piston 2.

As shown in FIG. 2, the plunger bore 15 has a step 32 facing the working chamber 3 into which a support ring 33 is introduced and axially secured by a retaining ring 34. The radial seal 27 is disposed between the support ring 33 and the end wall 35 of the step and consists of a sealing ring 36 and a tensioning ring 37 pressing the sealing ring 36 against the plunger piston 17. The tensioning ring 37 is an annular toroidal sealing ring which assumes an oval shape in the installed position. The sealing ring 36 consists of special, relatively soft polyurethane with 58 Shore D. Viewed in cross-section, the circumference 38 extends parallel to the plunger piston 17. The pressing force of the tensioning ring 37 produces a sealing surface 39 towards the surface area of the plunger piston 17. A gradation 41 is provided in the sealing ring 36 facing the pressure chamber 3, thereby pressing the sealing ring 36 against the end wall 35 when the working chamber 3 is at high pressure, wherein the associated element flank 42 abuts against the end wall 35 although it extends, in the pressure-less condition or at low pressures in the working chamber 3, at an angle with respect to the end wall 35. This deformation at high pressures effects increased pressing in the area of the sealing surface 39. The sealing ring has a conical surface 43, having a small wedge angle, between element flank 42 and sealing surface 39 which serves mainly to ensure that, with low storage pressure and largely undeformed sealing ring 36, the plunger piston 17 can easily penetrate through the sealing ring 36 when passing through the plunger bore 15. When the plunger piston 17 first contacts the conical surface 43, the sealing ring 36 is displaced in the direction of the support ring 33 and largely without deformation of the sealing ring 36 since, at the beginning of immersion, the hydraulic pressure on both sides of the sealing ring is approximately equal. Subsequently, the pressure in the working chamber 3 rapidly increases to thereby move the sealing ring 36 into the position shown and then into the deformation position. During the return stroke of the plunger piston 17, the pressure in the working chamber may be lower than that in the storage chamber 14 such that the sealing ring 36 is displaced into the position shown due to the frictional engagement between plunger piston 17 and sealing ring 36. Also in this case, no substantial deformation occurs.

The radial seal 29, disposed in the annular groove 28, between working piston 2 and casing 1 of FIG. 3 is basically of the same construction. A tensioning ring 44 acts radially on a sealing ring 45. The sealing ring 45 has a nearly rhombic cross-section with a gradation 46 facing the working chamber 3 and is supported, with a sealing surface 47, on the surface area of the piston 2. As soon as the pressure in the working chamber 3 is high enough, the element flank 48 of the sealing ring 45 is pressed against the end wall 49 of the annular groove 28 thereby increasing the pressing force of the sealing surface 47 and enhancing performance through the frictional engagement between piston 2 and sealing ring 45. The sealing ring 45 is thereby deformed considerably due to its relatively soft material, wherein, in particular, the circumferential area 51, parallel to the piston, is also displaced into a slightly conical disposition. As soon as the working piston 2 starts its return stroke and the pressure in the working chamber 3 is low or even at underpressure, the sealing ring 45 assumes its previous shape due to frictional engagement and is displaced in the direction of the working chamber 3 up to the other end wall of the annular groove 28. The sealing ring 45 assumes its initial shape and is not deformed again, since the underpressure is too low.

All the features mentioned in the description, the following claims and shown in the drawing may be essential to the invention either individually or in any arbitrary combination.

LIST OF REFERENCE NUMERALS 1 casing
2 working piston
3 working chamber
4 piston rod
5 auxiliary piston
6 tubular shell
7 pneumatic chamber
8 pneumatic chamber
9 casing part
10
11 tubular shell
12 casing lid
13 storage piston
14 storage chamber
15 plunger bore
16 drive piston
17 plunger piston
18 storage spring
19 spring chamber
20
21 driving chamber
22 connection
23 central bore
24 radial seal
25 radial seal
26 annular groove
27 radial seal
28 annular groove
29 radial seal
30
31 annular toroidal sealing ring
32 step
33 support ring
34 retaining ring
35 end wall
36 sealing ring
37 tensioning ring
38 circumferential surface
39 sealing surface
40
41 gradation
42 element flank
43 cone surface
44 tensioning ring
45 sealing ring
46 gradation
47 sealing surface
48 element flank
49 end wall
50
51 circumferential surface
I driving direction

I claim:

1. A hydropneumatic pressure intensifier comprising:
an apparatus casing having a cylindrical working chamber for accepting varying pressure, said varying pressure including a low storage pressure and a high working pressure;
a working piston delimiting an end face of said working chamber, said working piston actuated by said working pressure to effect a working stroke, said working piston guided for axial displacement and radial sealing with respect to a cylindrical wall of said working chamber;
a tubular shell having a storage chamber, said storage chamber in hydraulic communication with said working chamber, wherein, during a fast working stroke and in response to said storage pressure, hydraulic oil flows from said storage chamber into said working chamber and wherein, during a return stroke, hydraulic oil flows back into said storage chamber;
a plunger piston, said plunger piston actuated as a high pressure generator via at least one of pneumatic means and hydraulic means, said plunger piston immersed within said working chamber after said fast working stroke of said working piston;
a plunger bore disposed between said storage chamber and said working chamber, said plunger bore aligned with said plunger piston, said plunger piston moving into and through said plunger bore for introducing said working stroke, wherein said plunger piston is guided in a radially sealed and axially displaceable fashion; and
a dynamic radial seal disposed in an annular groove of said plunger bore proximate said plunger piston, said radial seal consisting essentially of a stationary rubber-elastic tensioning ring and an elastic plastic sealing ring disposed between said tensioning ring and said plunger piston, wherein a first circumferential surface of said sealing ring facing said working chamber and said plunger piston has a gradation, a second circumferential surface of said sealing ring facing a low pressure side and said plunger piston has a conical surface which opens at a small wedge angle, and a third surface of said sealing ring defines a changing, conical separation from a first end wall of said annular groove facing away from said working chamber, wherein a sealing surface of said sealing ring is disposed between said gradation and said conical surface, wherein, independent of a relative direction of motion between said plunger bore and said plunger piston, said third surface of said sealing ring is pressed, during said working stroke, by existing working pressure, with a reduction in said changing, conical separation towards said first end wall, wherein said sealing ring, said tensioning ring, said plunger bore, said annular groove, and said plunger piston are dimensioned and structured such that said sealing surface substantially deforms and widens when said plunger piston enters into said plunger bore without substantial deformation of other portions of said sealing ring, with said sealing ring subsequently substantially maintaining its shape while said plunger piston moves within said plunger bore.

2. The pressure intensifier of claim 1, wherein said first end wall of said annular groove is substantially parallel to a second end wall of said annular groove.

3. The pressure intensifier of claim 1, wherein said plastic material of said sealing ring does not have any metallic inclusions.

4. The pressure intensifier of claim 1, wherein said sealing ring consists of plastic material made from polyurethane 58 Shore D.

5. The pressure intensifier of claim 4, wherein said plastic material is Zurcon®.

6. The pressure intensifier of claim 4, wherein said plastic material is Rimseal®.

7. The pressure intensifier of claim 1, wherein said working piston comprises a pneumatically loaded collar for its fast stroke drive.

8. The pressure intensifier of claim 1, wherein said sealing ring is directly loaded by pressure in said working chamber, without any other intermediate sealing elements.

9. The pressure intensifier of claim 1, wherein a same sealing ring is disposed in both said plunger bore as well as in said cylindrical wall of said working chamber facing said working piston.

10. The pressure intensifier of claim 1, further comprising a second dynamic radial seal disposed in a second annular groove of said cylindrical wall of said working chamber proximate said working piston, said second radial seal consisting essentially of a second stationary rubber-elastic tensioning ring and a second elastic plastic sealing ring disposed between said second tensioning ring and said working piston, wherein a first circumferential surface of said second sealing ring facing said working chamber and said working position has a gradation, a second circumferential surface of said second sealing ring facing a low pressure side and said working piston has a conical surface which opens at a small, conical angle, and a third surface of said sealing ring defines a changing separation from a first end wall of said second annular groove facing away from said working chamber, wherein a sealing surface of said second sealing ring is disposed between said second ring gradation and said second ring conical surface, wherein, independent of a relative direction of motion between said second annular groove and said working piston, said third surface of said second ring is pressed, during said working stroke, by existing working pressure, and with a reduction in said changing, conical separation towards said first end wall of said second annular groove.

* * * * *